US007177708B2

(12) United States Patent
Glas et al.

(10) Patent No.: US 7,177,708 B2
(45) Date of Patent: Feb. 13, 2007

(54) METHOD FOR THE AUTOMATED CONTROL OF A TECHNICAL INSTALLATION AND PROCESS CONTROL SYSTEM FOR CARRYING OUT SAID METHOD

(75) Inventors: Karl Glas, Herzogenaurach (DE); Juergen Kroener, Remchingen-Singen (DE); Matthias Rebellius, Meilen (CH); Ulrich Sinn, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/045,323

(22) Filed: Jan. 31, 2005

(65) Prior Publication Data

US 2005/0222691 A1 Oct. 6, 2005

Related U.S. Application Data

(63) Continuation of application No. PCT/DE2003/002549, filed on Jul. 29, 2003.

(30) Foreign Application Priority Data

Jul. 29, 2002 (DE) ............... 102 34 467

(51) Int. Cl.
*G05B 19/418* (2006.01)
*G05B 11/01* (2006.01)

(52) U.S. Cl. .................. 700/19; 370/225; 700/247; 700/248

(58) Field of Classification Search ............... 700/19, 700/247, 248; 370/225
See application file for complete search history.

(56) References Cited

U.S. PATENT DOCUMENTS 5,682,476 A * 10/1997 Tapperson et al. .......... 370/225
6,356,793 B1 * 3/2002 Martin ........................ 700/19
6,928,336 B2 * 8/2005 Peshkin et al. ............. 700/245

FOREIGN PATENT DOCUMENTS

DE 44 21 349 A1 10/1995
DE 689 25 271 T2 12/1995

(Continued)

OTHER PUBLICATIONS

IEEE Standard Terms, p. 912.*

(Continued)

*Primary Examiner*—Anthony Knight
*Assistant Examiner*—Sunray Chang
(74) *Attorney, Agent, or Firm*—Sughrue Mion, PLLC

(57) ABSTRACT

A method and a system for the automated control of a technical installation (2) having a plurality of installation components (4) that are interconnected by data transmission in order to carry out process steps. Control commands (S) which are generated by a central control device (6) are fed to these components in accordance with process control signals (P) that are sent to the device. Process control signals (P) that are generated in a mobile operator unit (12) are wirelessly transmitted to interfaces (14) and are forwarded by the latter to the control device (6). The installation components (4) for which the system considers the process control signals (P) received from the mobile operator unit (12) during the generation of the corresponding control commands (S) are released using a local characteristic value (O) for the mobile operator unit (12).

28 Claims, 1 Drawing Sheet

FOREIGN PATENT DOCUMENTS

| | | |
|---|---|---|
| DE | 197 32 011 A1 | 1/1999 |
| DE | 199 46 441 A1 | 4/2001 |
| DE | 101 10 776 A1 | 9/2001 |
| DE | 100 41 104 C1 | 3/2002 |
| DE | 100 41 109 A1 | 3/2002 |
| EP | 0 654 721 A1 | 5/1995 |
| EP | 0 825 506 A2 | 2/1998 |
| EP | 1 128 244 A2 | 8/2001 |

OTHER PUBLICATIONS

Universal Serial Bus Specification Revision 1.1, Sep. 1998.*

Günther Herkommer, "Die Kombi-Lösung", Computer & Automation, vol. 01/2002, pp. 44-47.

* cited by examiner

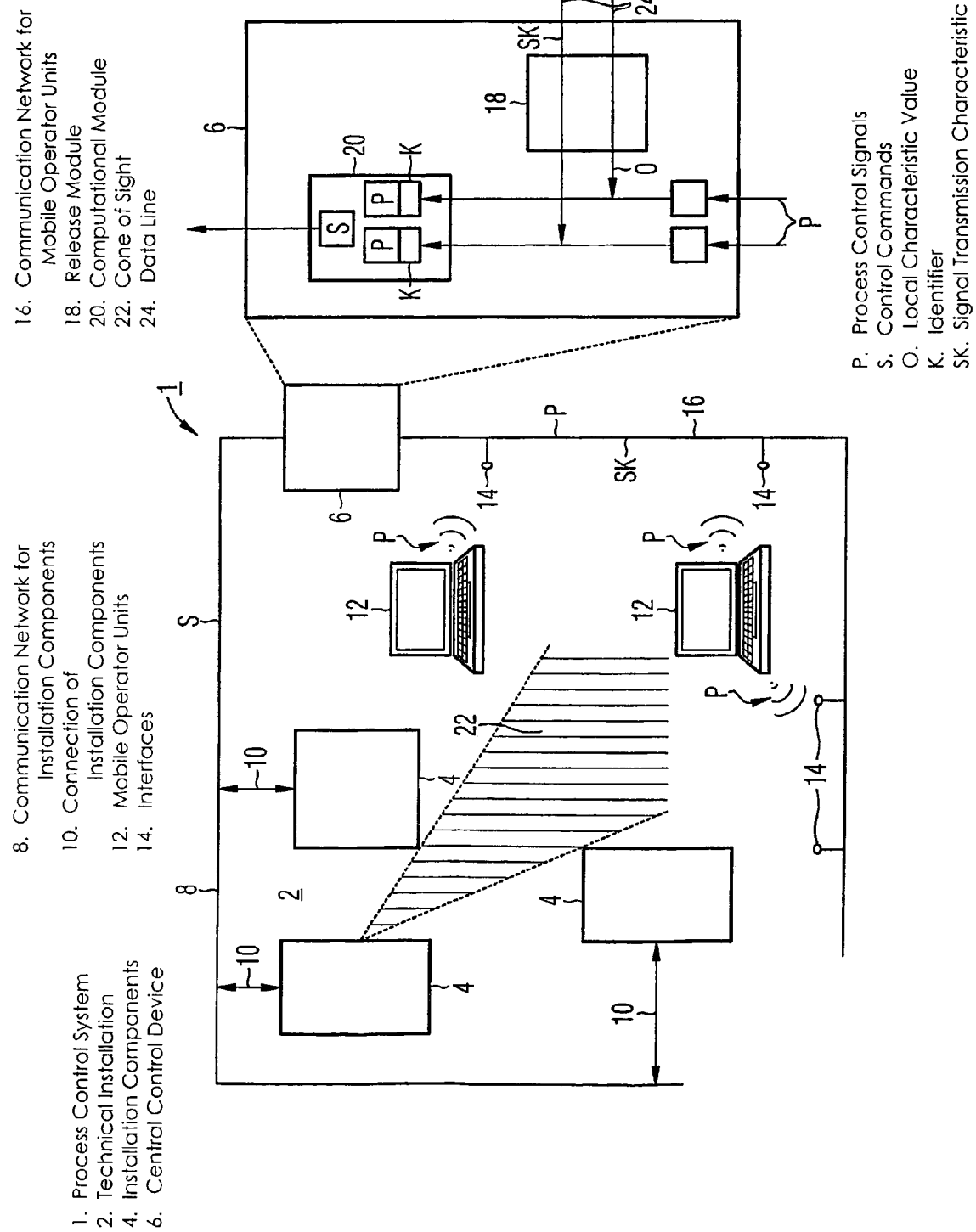

METHOD FOR THE AUTOMATED CONTROL OF A TECHNICAL INSTALLATION AND PROCESS CONTROL SYSTEM FOR CARRYING OUT SAID METHOD

This is a Continuation of International Application PCT/DE2003/002549, with an international filing date of Jul. 29, 2003, which was published under PCT Article 21(2) in German, and the disclosure of which is incorporated into this application by reference.

FIELD AND BACKGROUND OF THE INVENTION

1. Field of the Invention

The present invention relates to a method for the automated control of a technical installation having a plurality of installation components, which are interconnected by data transmission to carry out process steps.

In particular, in the present invention is related to a method for automated control, which is adopted to carry out the following steps: generating by the central control device control commands while considering process control signals which are sent to the central control device and feeding the control commands to the installation components, where the process control signals generated in a mobile operator unit are wirelessly transmitted to interfaces and are forwarded by these interfaces to the control device.

2. Description of Related Art

In technical installations provided to carry out relatively complex technical processes, a plurality of installation components may need to interact with each other in a coordinated manner. For an automated process management or control, a technical installation with a plurality of installation components is usually assigned a process control system or an automation system, in which control commands for the individual installation components are typically output by a central control device. This central control device ensures that the mode of operation and the operating status of each installation component are properly coordinated with the other installation components with respect to the predefined process flow of the entire installation. The central control device, on the input side, is usually connected to a plurality of sensors for detecting the respective operating statuses of the individual installation components and, on the output side, is suitably connected to the installation components to transmit the control commands.

To enable the operator personnel to intervene in the process flow of the technical installation, e.g., to appropriately control the actual process flow in view of possibly varying process goals or to enable state monitoring or emergency overrides with respect to specified safety requirements, the respective central control device assigned to the technical installation is usually further connected to control or operator units on the input side. These operator units are used by the operator personnel to enter appropriate operator commands to control the process. Each operator unit can be processor-controlled and permanently installed in a fixed location, e.g., in the form of a personal computer (PC) or a control console.

In the more recent automated process control concepts, however, it may be desirable to provide the operator personnel with suitable mobile access to influence the process flow. To provide the operator personnel with mobile access, the operator units or at least a portion thereof may be configured as mobile units. These mobile units communicate with the central control device through a wireless connection, e.g., a radio link, to transmit process control signals. Wireless networking technology, as implemented, for example, in so-called wireless LANs (WLANs), may be used to wirelessly connect panels, laptops or web pads as mobile operator units to the central control device.

In addition to the process control signals considered when generating the control commands, other communication parameters, such as diagnostic parameters, may be wirelessly transmitted, including from the central control device to the respective mobile operator unit.

Because of the mobility of closed-loop and open-loop control, diagnostics or visualization of the individual process steps or states, such a configuration of an automation system or process control system affords a high degree of flexibility in the process control of the technical installation.

However, the mobility achieved for the operator personnel for interventions in the process flows of the technical installation has the risk that the operator will move relatively far away from the installation component or the portion of the machinery that needs to be controlled in the respective process state. Consequently, direct observation of the installation component to be controlled is not guaranteed during the intervention in the process flow. As a result, if incorrect operations occur or if changes in the process state can initially be observed only directly at the respective installation component, the absence of direct visual contact could cause an operator response that is inappropriate for the installation situation as a whole. Furthermore, if the respective mobile operator unit is physically too remote from the currently used interface, the transmission quality can be affected, which in turn can cause transmission errors and therefore process errors.

To avoid these problems and to provide a particularly high degree of operational safety through proper and situationally appropriate operation of the automation system of the technical installation, it is desirable to limit the release of the access from a mobile operator unit to specific installation components. To limit the release of the access from a mobile operator unit, the German Laid Open Publication DE 101 107 76 A1, which is incorporated herein by reference, discloses a method using mobile operator units, where the respective unit is first assigned to the installation component to be controlled before an operator's intervention in the process flow of an installation component is released. An intervention in the process is released only after the installation component in which the respective intervention in the process flow is to occur has been properly assigned to the mobile operator unit being used at the time.

From the article by Günter Herkommer titled "Die Kombilösung" (The Multi-Purpose Solution), Computer & Automation, Volume 01/2002, pp. 44–47, which is incorporated herein by reference, it is known to release interventions in the process flows of a technical installation from mobile operator units as a function of the current location of the operator in relation to the installation components.

In both of these systems (the system described in the German Laid Open Publication DE 101 107 76 A1 and the system described in the article by Günter Herkommer titled "Die Kombilösung" (The Multi-Purpose Solution), Computer & Automation, Volume 01/2002, pp. 44–47), to detect the operator's location, a separate positioning system is provided. This system can, for example, be an infrared-based system, particularly to avoid affecting other functional flows. As a result, however, these automation systems or process control systems are comparatively complex.

OBJECTS OF THE INVENTION

Thus, one object of the present invention is to provide a method for the automated control of a technical installation of the above-described type, which ensures a particularly high degree of operational safety even when the process is controlled from mobile operator units, but minimizes the technical complexity.

Another object of the present invention is to provide a specially adapted process control system which reduces the technical complexity for the automated control of a technical installation of the above-described type, and which ensures a particularly high degree of operational safety even when the process is controlled from mobile operator units.

Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

SUMMARY OF THE INVENTION

According to an illustrative, non-limiting formulation of the present invention, a method for the automated control of a technical installation having a plurality of installation components is provided. A mobile operator unit generates process control signals. These process control signals are wirelessly transmitted to interfaces, which, in turn, forward these process control signals to a central control device. The central control device generates control commands in accordance with the received process control signals. These control commands are fed back to the installation components. Those installation components, for which the process control signals received from the mobile operator unit are relevant, are released when the respective control commands are generated, using a local characteristic value for the mobile operator unit. This characteristic value is determined by the interfaces that communicate wirelessly with the mobile operator unit.

The non-limiting formulation is based on an insight that, to ensure a high degree of operational safety, the current location from where an operator intervenes in the process flow of an installation component, should be taken into account when the access to the respective installation component is released. To minimize the respective technical operational complexity, the number of the parts and components provided for this release function should be kept low. As a result, instead of an independent partial network provided exclusively to determine the current location of the respective mobile operator unit, it is preferable to primarily use existing parts and components to determine the local characteristic value to release operator accesses to individual installation components.

The non-limiting formulation, makes use of the fact that the communication connection between each mobile operator unit and the interfaces used—which is necessary in any event for the wireless transmission of the process control signals determined from the control commands that are entered into the mobile operator units—is characterized by measurable parameters with respect to its transmission properties. These parameters can be used to determine the local characteristic value for the mobile operator unit.

In the non-limiting formulation, to ensure a high degree of process control flexibility, wireless data transmission is provided between each mobile operator unit and the interfaces. The interfaces can be physically positioned such that they cover the entire area of the respective technical installation. The process control signals can be suitably forwarded from the interfaces to the central control device, particularly also by wireless transmission, or using a conventional wirebound communication network.

To achieve a particularly high degree of process control flexibility and operational safety, an advantageous further refinement of the present invention uses the local characteristic value of the mobile operator unit determined in relation to the location of the respective installation component to make a classification by control command categories for which access by each mobile operator unit to the installation component is released. It is possible, in particular, to differentiate between control commands which represent a substantial intervention in the process running on the installation component and thus present a risk of incorrect operations in the operational flow and control commands which in principle do not present a risk to the operational flow, e.g., diagnostic requests or read-outs of operating parameters for visualization purposes.

To distinguish between these two types of control commands, according to another illustrative, non-limiting refinement of the present formulation, a control command category is advantageously specified for the release of an installation component that is to be accessed by the respective mobile operator unit as a function of its location, such that the process control signal received from the mobile operator unit is taken into account only if control commands belonging to the specified control command category are generated. It may be provided, for example, that as a function of the local characteristic value determined for the mobile operator unit and the location of the respective installation component, a release is granted only for the control commands of the category "diagnostics" but denied for the control commands of the category "control interventions."

According an exemplary refinement of the present formulation, to determine the local characteristic value for the mobile operator unit, characteristic operating parameters for the signal transmission between each interface and the mobile operator unit are preferably evaluated. In particular, a signal intensity, e.g., the intensity of the process control signals emitted by the mobile operator unit and received by the respective interface, can be evaluated and, in particular, compared with a reference intensity.

To ensure a particularly high degree of operational safety, especially when control commands are released for a given installation component to make a substantial and therefore risk-relevant intervention in the respective installation component, the criteria used to determine whether a release is to be granted to the respective mobile operator unit is preferably based on whether the respective installation component can be observed from the current location of the mobile operator unit.

The wireless communication network formed by the mobile operator units and the interfaces as a whole can be configured in such a way that the signals from a mobile operator unit to the central control device are transmitted only through one of the interfaces. Only this selected interface is released for the transmission of the signals of the mobile operator unit to the central control device. When the wireless communication network is operated in this manner, a distinctive positional characteristic for the selected interface is preferably used as the local characteristic value for the mobile operator unit. This takes into account the active interface—also referred to as the current access point—such that the release criterion, for example, is that the installation components must be observable from the location of the current access point before access from the mobile operator unit is released.

Advantageously, the local characteristic value for the mobile operator unit can be determined particularly reliably by establishing a characteristic signal transmission time when signals are transmitted between the mobile operator unit and the respective interface. Particularly, if a plurality of interfaces is taken into account, a relatively precise assignment of a local characteristic value to the mobile operator unit can be made from a plurality of individually measured signal transmission times between the individual interfaces and the mobile operator unit.

For a particularly precise evaluation of the signal transmission properties between the mobile operator unit and the respective interfaces, used in turn for a particularly precise determination of the local characteristic value, the signals between each interface and the mobile operator unit are preferably transmitted on two channels. To transmit signals between the mobile operator unit and the respective interface, a transmission channel is established which is used to transmit the process control signals from the mobile operator unit to the respective interface. In addition to this transmission channel, a control channel is preferably established between the mobile operator unit and the respective interface, which is primarily not used to transmit actual signals. Instead, the control channel is essentially reserved for transmitting test signals, which are used to determine the local characteristic value by specifically evaluating individual signal parameters, e.g., the signal intensity or the transmission times.

According to another exemplary, non-limiting formulation of the present invention, an automation system or process control system for a technical installation particularly suitable for automated control of the technical installation process is provided. The system according to the illustrative formulation includes a central control device, which generates control commands for a number of system components using incoming process control signals. The control device is connected to the system components on its data output side and to a plurality of interfaces on its data input side. These interfaces are in turn wirelessly connected on their respective data input side to a plurality of mobile operator units for the transmission of the process control signals. The control device has a release module. This release module uses a local characteristic value that is distinctive for the respective mobile operator unit. The local characteristic value is determined via the interfaces wirelessly communicating with the mobile operator units. As a result, each process control signal received from a mobile operator unit is assigned an identifier of the installation components for which the process control signal is to be taken into account when the control commands addressed to the installation components are generated.

The process control system is thus specifically configured to use parameters that are characteristic for the type and/or quality of the wireless signal transmission between the mobile operator unit and/or the interfaces. With the aid of these parameters used in the process control system to determine a local characteristic value for each mobile operator unit, an assignment can be made for each process control signal received from a mobile operator unit that determines for which installation components the respective process control signal may or may not be considered.

When specific releases are assigned to the process control signals received from the mobile operator units, it is advantageously possible to further consider the type or category of the control command provided for the respective installation component. In this type of stepped or qualified release of the process control signals received through the mobile operator units, the process control signals received for the individual installation components must be handled as required and appropriate in a given situation. For this purpose, the release module, preferably when the installation components are identified, specifies for each installation component a control command category for considering the process control signal.

To generate suitable release characteristics as required, the release module is advantageously connected to sensors provided on the input side of the release module to detect operating parameters, particularly a signal intensity, which are characteristic for the signal transmission between each interface and the mobile operator unit.

In addition, advantageously, the release model is configured to consider the observational angle or view of the respective installation component from the current location of the mobile operator unit as a criterion for the release of a process control access to the respective installation component. In an additional or alternative advantageous refinement of the exemplary formulation, the local characteristic value used by the release module is a positional characteristic, which is distinctive for the interface that is currently used exclusively to transmit the process control signals to the central control device.

To make it possible to consider a time characteristic in the form of a signal transmission time in the evaluation of the transmission properties between the mobile operator unit and the respective interface, the release module is advantageously connected to time measuring devices on its input side to record a characteristic signal transmission time between the respective interface and the mobile operator unit.

According to the exemplary, non-limiting formulations, the specific use of the transmission characteristics in the signal transmission from the mobile operator unit to each of the interfaces of the process control system, and using the existing parts and components minimizes the equipment complexity. Moreover, it is possible to reliably determine a local characteristic value for each mobile operator unit. Taking this local characteristic value into consideration when deciding for which installation components the process control signals received from the respective mobile operator unit may be taken into account ensures a particularly high degree of operational process control safety and at the same time affords a high degree of flexibility for the operator personnel, even if the technical installation to be controlled has a large number of installation components, which can be distributed over a comparatively large physical area.

BRIEF DESCRIPTION OF THE DRAWINGS

The present invention will now be described in detail by describing illustrative, non-limiting embodiments thereof with reference to the accompanying drawing. The accompanying drawing depicts a process control system of a technical installation according to the exemplary, non-limiting embodiment of the present invention. In the drawing, the same reference characters denote analogous elements.

DETAILED DESCRIPTION OF ILLUSTRATIVE, NON-LIMITING EMBODIMENTS

An e exemplary automation system or process control system 1 depicted in the figure is associated with a relatively complex technical installation 2. This technical installation 2 has a number of interacting, mutually coordinated, installation components 4, which are represented only schematically in the figure. These installation components 4 carry out a complex industrial process. These installation components 4 can in turn be comparatively complex components, such as machines, robots or system components. Depending on the purpose for which they are provided within the overall process of the technical installation 2, the dimensions of the installation components 4 can be comparatively large and they can be physically distributed over a comparatively large total area, e.g., a production hall.

The process control system 1 is provided to control the entire process of the technical installation 2. In particular, the process control system 1 is configured to ensure that all of the installation components 4 of the technical installation 2 are working in a synchronized and coordinated manner and that all of these installation components 4 are in a coordinated operating mode. To ensure this coordination and synchronization, the process control system 1 has a central control device 6, which communicates with the installation components 4 via a communication network 8. In the exemplary embodiment, the communication network 8 is configured as a wire-bound, conventionally wired network. This network, however, is provided by way of an example only and the network could also be a wireless network for signal transmission or some other network known to one of ordinary skill in the art.

As indicated in the figure by the double arrows 10, each installation component 4 is connected to the communication network 8 for data transmission. Hence, each installation component 4 can feed its characteristic operating parameters and other characteristics to the central control device 6. By receiving the characteristics of each installation component 4, the central device 6, at any time, as needed, can detect the operating state of each installation component 4. Furthermore, control commands S generated by the central control device 6 can be transmitted to each installation component 4 via the communication network 8. These control commands S can particularly be converted by control modules specifically assigned within each installation component 4 into concrete control commands for individual parts of the respective installation component 4.

Thus, by transmitting suitable control commands S via the communication network 8, the central control device 6 individually controls the behavior of each installation component 4, thereby maintaining a synchronized and coordinated process flow in the individual installation components 4.

To manually control the operations or to specify individual process goals or individual process control steps, control commands of the operator personnel can be supplied to the central control device 6. For the input of suitable control commands, the central control device 6 can be provided with an input device, which is permanently installed on the input side. In the exemplary embodiment depicted in the figure, however, the process control system 1 is configured for a very flexible and, in particular, physically independent input of the operating commands by the operator personnel. To provide the operator with a flexible and independent from the physical location way to input the operating commands, the process control system 1 has a plurality of mobile operator units 12. In the exemplary embodiment depicted in the figure, laptops are provided as the mobile operator units 12. As an alternative or in addition, however, panels, web pads or other suitable input devices may also be provided as mobile operator units 12.

Operator commands or process control commands entered into the mobile operator units 12 by the operator personnel are converted therein into process control signals P. These process control signals P can then be transmitted over the data network. To forward the process control signals P, the mobile operator units 12 are wirelessly networked with suitable receivers or interfaces 14. Examples of wireless networks are WLANs according to IEEE 802.11, Bluetooth, or other methods suitable for wireless transmission of digital signals.

The interfaces 14 are distributed with respect to their number and/or their physical positioning within the area of the technical installation 2 so as to ensure a reliable radio link between at least one of the interfaces 14 and a mobile operator unit 12 positioned in the assigned area of the respective interface. That is, whenever a mobile operator unit 12 is positioned within an area of the technical installation 2, the mobile operator unit 12 will have a reliable radio link with at least one of the interfaces 14 assigned to this area. The interfaces 14, in turn, are connected to the central control device 6 via a communication network 16. In the exemplary embodiment depicted in the figure, the communication network 16 is a wire-bound, conventional network, but it could also be a wireless network, or any other suitable network known to one of ordinary skill in the art.

During operation of the technical installation 2 and the associated process control system 1, the operator personnel record the operator or control commands using one or more of the mobile operator units 12. The recorded operator or control commands are generated by the mobile operator units 12 into a suitable form, i.e., process control signals P and these process control signals P are fed to the central control device 6 through the respective active interfaces 14. Based on the incoming process control signals P, the central control device 6 then generates suitable control commands S for the individual installation components 4. These generated suitable control commands S are then transmitted to these installation components 4 over the communication network 8.

Due to the mobility of the mobile operator units 12, a risk that an operator, from his current location, could also directly influence an installation component 4 that he cannot observe or can only poorly observe, arises. When the operator influences an installation component 4 that he can only poorly observe, incorrect operations are possible due to long signal transmission times, long response times, and so on.

To avoid possibly incorrect operations and to exclude the risk of incorrect actions because of long signal transmission times or response times when the operator is too remote from the installation components 4 to be currently controlled, the process control system 1 is equipped for a selective release of process control signals P as control commands S are generated for the individual installation components 4. For the selective release of process control signals P as control commands S are generated, the central control device 6 has a release module 18, which is schematically depicted in the enlarged detailed view of the central control device 6 illustrated in the right part of the figure.

The release module 18 assigns an identifier K to each process control signal P received in the central control device 6. This identifier K indicates for which of the installation components 4 the respective process control signal P may or should be taken into account when the associated control commands S are generated.

Furthermore, the central control device 6 has a computation module 20, which is depicted in the detailed view of the central control device 6. The computation module 20 is connected on the outgoing side of the data stream. The computation module 20 uses the incoming process control signals P to generate control commands S for the individual installation components 4. Using the associated identifier K, the computation module 20 checks for each process control signal P whether that process control signal P may be taken into account when the respective control command S is generated.

The specific identifier K for the respective process control signal P generated by the release module 18 uses a stored code to identify the installation components 4 for which the respective process control signal P is released and can thus be taken into account. In addition, the identifier K uses a further stored code to specify the type or category of control commands S for which the respective process control signal P is to be taken into account. After the assignment of the identifier K, it is thus unambiguously established for each process control signal P which category or type of control commands S may be generated for which of the installation components 4 using this process control signal P.

With respect to the category or type of the control command S, a distinction is drawn, in particular, between non-risk-relevant control commands S, such as the query of diagnostic parameters, and possibly risk-relevant control commands S, such as active control interventions in the partial process running on the respective installation component 4. The identifier K can thus be used to assign a unique release to each process control signal P. The unique release assigned using the identifier K specifies whether and to what extent this process control signal P is to be taken into account when control commands S are generated for the individual installation components 4. In particular, the identifier K can show whether the respective process control signal P should be taken into account fully, partially or not at all for a specific installation component 4.

When the associated identifier K is generated, a criterion is used for a release and, where applicable, the degree of the release, i.e. to take into account the respective process control signal P. The criterion is the current physical positioning of the respective mobile operator unit 12 in relation to the respective installation component 4. To establish this criterion, a local characteristic value O distinctive for the current position of the respective mobile operator unit is determined and used to generate the identifier K. When the identifier K is generated using the local characteristic value O, the system particularly considers whether and, where applicable, how well the respective installation component 4 can be observed from the current location of the mobile operator unit 12 and the extent to which the operator can directly influence the respective installation component 4 from the current location of the mobile operator unit 12. In particular, the system may consider whether the line of sight from the current location of the mobile operator unit 12 to the respective installation component 4 is blocked in whole or in part by another installation component 4 or some other obstacle, for example, as depicted in the figure by the cone of sight or cone of vision 22.

To minimize the equipment complexity and the technical complexity involved in determining the local characteristic value O for the respective mobile operator unit 12 that is taken into account in the release, the process control system 1 evaluates the characteristic signal transmission properties in the communication between each mobile operator unit 12 and the interfaces 14. Thus, the current location of each mobile operator unit 12 is determined not by a separate positioning system but by using components that are already required for the communication with the central control device 6.

To avoid establishing a separate positioning system, the release module 18, which determines the local characteristic value O for each mobile operator unit 12, which, in turn is used to generate the identifier K for the respective process control signal P, is connected on its input side via data lines 24 to suitable sensors provided at each interface 14. However, the release module 18 can also be connected to the sensors via the communication network 16, which is already provided for the communication of the interfaces 14 with the central control device 6. Through the associated sensors, the release module 18 determines suitable parameters using distinctive signal transmission characteristics SK, such as the intensity of the signals received from each mobile operator unit 12 at the respective interface 14 and/or their characteristic signal transmission time. Particularly, by evaluating the transmission parameters for each of a plurality of the interfaces 14, it is possible to establish with relative precision the local characteristic value O for the mobile operator unit 12. The distinctive signal transmission characteristics SK that are particularly evaluated are the characteristics of the analog signals at the interfaces 14, that is to say, for example, field strengths, transmission times or signal-to-noise ratios.

As an alternative or in addition, it may also be provided that the mobile operator unit 12 communicates with the central control device 6 over only one of the interfaces 14, such that the optimal interface 14 for signal transmission is selected and all the other interfaces 14 are suppressed. When the interfaces 14 are used in this manner, a local characteristic value O distinctive for the selected interface 14 can be used as the local characteristic value O for the mobile operator unit 12.

To limit access to an installation component 4 exclusively to the area from which the respective installation component 4 can, for example, be observed, an associated interface 14 can be adapted using, for example, a suitable configuration of the radio antenna provided for signal transmission with the mobile operator unit 12. Signal transmission between the mobile operator unit 12 and this interface 14 is then possible only if the respective installation component 4 can be observed from the current position of the mobile operator unit 12. In this configuration, for example, a release of the process control signals P transmitted from the mobile operator unit 12 is provided for the respective installation component 4 only if the control signals P are transmitted via the associated interface 14.

As an alternative or in addition, it may be provided that for a signal transmission between each mobile operator unit 12 and the one or more interfaces 14, two parallel transmission channels are activated and used for data or radio transmission. One transmission channel is used for the actual transmission of the process control signals P while the other transmission channel is used for the separate transmission of test signals. The signal characteristics of the test signals are in turn evaluated to determine the local characteristic value.

The above description of illustrative, non-limiting embodiment and variations thereof has been given by way of an example. The above and other features of the invention including various novel method steps and various novel system components have been particularly described with reference to the accompanying drawing and pointed out in the claims. It will be understood that the particular process and construction of parts embodying the invention are shown by way of an illustration only and not as a limitation of the invention. The principles and features of this invention may be employed in varied and numerous embodiments without departing from the scope of the invention as defined by the appended claims and equivalents thereof.

What is claimed is:

1. A method for the automated control of a technical installation having a plurality of installation components, which are interconnected by data transmission, the method comprising:
   generating process control signals in a mobile operator unit;
   wirelessly transmitting to interfaces the generated process control signals;
   forwarding the transmitted process control signals by the interfaces to a central control device;
   receiving by the central control device the forwarded process control signals;
   generating, by the central control device, control commands taking into consideration the received process control signals; and
   feeding by the central control device to at least one of the plurality of installation components the generated control commands,
   wherein the installation components, for which the process control signals received from the mobile operator unit are relevant, are released when associated control commands are generated, and
   wherein the installation components are released using a local characteristic value for the mobile operator unit, where the local characteristic value is determined using the interfaces which wirelessly communicate with the mobile operator unit.

2. The method as claimed in claim 1, wherein a control command category is specified when an installation component from the installation components is released, such that respective process control signal is relevant only when generating control commands associated with the specified control command category.

3. The method as claimed in claim 2, wherein operating parameters for signal transmission between the respective interface and the mobile operator unit are evaluated to determine the local characteristic value.

4. The method as claimed in claim 3, wherein the operating parameters comprise a signal intensity characteristic for signal transmission between the interface and the respective mobile operator unit.

5. The method as claimed in claim 3, wherein, to release the installation components that can be influenced through the mobile operator unit, the local characteristic value and the local parameters stored for each installation component are used to establish whether respective installation component can be observed from a current location of the mobile operator unit.

6. The method as claimed in claim 1, wherein operating parameters are evaluated to determine the local characteristic value.

7. The method as claimed in claim 6, wherein the operating parameters comprise a signal intensity characteristic for signal transmission between an interface and respective mobile operator unit.

8. The method as claimed in claim 7, wherein, to release the installation components that can be influenced through the mobile operator unit, the local characteristic value and the local parameters stored for each installation component are used to establish whether respective installation component can be observed from a current location of the mobile operator unit.

9. The method as claimed in claim 1, wherein, to release the installation components that can be influenced through the mobile operator unit, the local characteristic value and the local parameters stored for each installation component are used to establish whether respective installation component can be observed from a current location of the mobile operator unit.

10. The method as claimed in claim 9, wherein an interface is selected from the plurality of available interfaces, said selected interface is currently used exclusively to transmit the process control signals to the central control device such that a positional characteristic that is distinctive for the selected interface is used as the local characteristic value for the mobile operator unit.

11. The method as claimed in claim 9, wherein signal transmission time for transmission of signals between the mobile operator unit and an interface is taken into account to determine the local characteristic value.

12. The method as claimed in claim 1, wherein an interface is selected from the plurality of available interfaces, said selected interface is currently used exclusively to transmit the process control signals to the central control device such that a positional characteristic that is distinctive for the selected interface is used as the local characteristic value for the mobile operator unit.

13. The method as claimed in claim 12, wherein, in a signal transmission between the mobile operator unit and the interface, a control channel is established in addition to a transmission channel for the process control signals, and wherein the local characteristic value is determined in accordance with transmission characteristics of the control channel t.

14. The method as claimed in claim 1, wherein, in determining the local characteristic value, transmission time for transmission of signals between the mobile operator unit and a respective interface is relevant.

15. The method as claimed in claim 14, wherein, in the transmission of signals between the mobile operator unit and the respective interface, a control channel is established in addition to a transmission channel for the process control signals, and determining the local characteristic value in accordance with transmission characteristics of the control channel.

16. The method as claimed in claim 1, wherein, in a signal transmission between the mobile operator unit and a respective interface, a control channel is established in addition to a transmission channel for the process control signals, and wherein in determining the local characteristic value, transmission characteristics of the control channel are evaluated.

17. A process control system for a technical installation, comprising:
   a plurality of installation components;
   a central control device that uses incoming process control signals to generate control commands for the plurality of installation components, where the control device is connected to the installation components on data output side;
   a plurality of interfaces connected to the central control device on the central control device's data input side; and a plurality of mobile operator units connected to the plurality of interfaces on the data input side of the plurality of interfaces for transmission of the process control signals, wherein the control device comprises a release module, which uses a local characteristic value distinctive for associated mobile operator unit from the plurality of the mobile operator units, the local characteristic value is determined via the plurality of interfaces that wirelessly communicate with the mobile operator units to assign each process control signal received from a mobile operator unit an identifier of the installation component for which the process control signal is relevant when the control commands addressed to the installation components are generated.

18. The process control system as claimed in claim 17, wherein, during identification of the installation components, the release module, specifies for each of the installation components involved a control command category for relevance of the process control signal.

19. The process control system as claimed in claim 17, wherein the release module is connected to sensors on the input side, which are provided to detect operating parameters, and wherein said operating parameters are characteristic for the signal transmission between the respective interface and the mobile operator unit.

20. The process control system as claimed in claim 19, wherein the operating parameters comprise a signal intensity for the signal transmission between the respective interface and the mobile operator unit.

21. The process control system as claimed in claim 17, wherein the release module uses the local characteristic value and local parameters stored for the respective installation component to determine whether the respective installation component can be observed from current location of the mobile operator unit.

22. The process control system as claimed in claim 17, wherein the release module uses a positional characteristic as the local characteristic value, which is distinctive for the interface that is currently used exclusively to transmit the process control signals to the central control device.

23. The process control system as claimed in claim 17, wherein, on the input side, the release module is connected to time measuring devices to record a characteristic signal transmission time between the respective interface and the mobile operator unit.

24. The process control system as claimed in claim 17, wherein the interfaces are configured for a multi-channel, wireless signal transmission to the mobile operator units, and wherein on the input side, the release module is connected to sensors, which are provided to detect operating parameters characteristic of transmission properties of a control channel established between the respective interface and the mobile operator unit, where the control channel is parallel to a transmission channel for the process control signals.

25. The method for the automated control as claimed in claim 1, wherein the process control signals for controlling the installation components are transmitted in a wireless communication channel from the mobile operator unit to one of the plurality of interfaces and wherein the local characteristic value indicating a current position of the mobile operator unit is determined based on characteristics of the wireless communication channel.

26. The process control system as claimed in claim 17, wherein the process control signals for controlling the installation components are transmitted in a wireless communication channel from one of the mobile operator units to one of the plurality of interfaces and wherein the local characteristic value indicating a current position of the one mobile operator unit is determined based on characteristics of the wireless communication channel.

27. The method for the automated control as claimed in claim 1, wherein:

the releasing of the installation components comprises permitting the mobile operator unit to control the installation component by generating the control commands corresponding to the process control signals receiving from the mobile operator unit, the local characteristic value indicates location of the mobile operator unit, and the location of the mobile operator unit is determined based on same wireless channel via which the process control signals are transmitted from the mobile operator unit to the central control device.

28. The process control system as claimed in claim 17, wherein:

the release module permits the mobile operator unit to control at least one of the installation components based on:

the process control signal received by the central control device via a wireless communication channel from the mobile operator unit, and the local characteristic value determined from characteristics of the same wireless communication channel used by the mobile operator unit to transmit the process control signal.

* * * * *